United States Patent
Siercke et al.

(12) United States Patent (10) Patent No.: US 8,393,566 B2
Siercke et al. (45) Date of Patent: Mar. 12, 2013

(54) AIR INLET FOR A VEHICLE

(75) Inventors: Matthias Siercke, Hamburg (DE);
Ulrich Heise, Hamburg (DE); Joakim Holmgren, Hamburg (DE); Adeline Gommet, Hamburg (DE)

(73) Assignee: Airbus Operations GmbH (DE)

( * ) Notice: Subject to any disclaimer, the term of this patent is extended or adjusted under 35 U.S.C. 154(b) by 830 days.

(21) Appl. No.: 12/474,345

(22) Filed: May 29, 2009

(65) Prior Publication Data
US 2010/0044522 A1 Feb. 25, 2010

Related U.S. Application Data

(60) Provisional application No. 61/131,024, filed on Jun. 5, 2008.

(30) Foreign Application Priority Data

Jun. 5, 2008 (DE) .................. 10 2008 026 877

(51) Int. Cl.
*B64C 33/02* (2006.01)
(52) U.S. Cl. ............. 244/53 B; 244/1 N; 137/15.1
(58) Field of Classification Search ............ 244/1 N, 244/130, 53 B, 198, 200, 200.1; 137/15.1
See application file for complete search history.

(56) References Cited

U.S. PATENT DOCUMENTS 2,810,534 A * 10/1957 Fandeux ...................... 244/58
4,378,097 A * 3/1983 Ferguson et al. ............ 244/53 B

FOREIGN PATENT DOCUMENTS

DE 10216969 10/2003

* cited by examiner

*Primary Examiner* — Timothy D Collins
*Assistant Examiner* — Nicholas McFall
(74) *Attorney, Agent, or Firm* — Lerner, David, Littenberg, Krumholz & Mentlik, LLP

(57) ABSTRACT

The invention relates to an air inlet for a vehicle comprising an opening with an opening contour in an outer skin of the vehicle; at least one bottom element; one or several walls between the opening contour and the bottom element; and an air guide channel with a longitudinal axis, wherein the bottom element extends from the outer skin of the vehicle to an interior region of the vehicle underneath a border edge of the opening, and the air guide channel adjoins from between the bottom element and the border edge, wherein at least one transition region between the opening contour and the walls at least in some regions comprises an essentially convex-shaped profile that essentially extends parallel to the air guide channel. The air inlet according to the invention is in a position to remove air from a flow boundary layer and to provide said air to air-consuming systems.

16 Claims, 4 Drawing Sheets

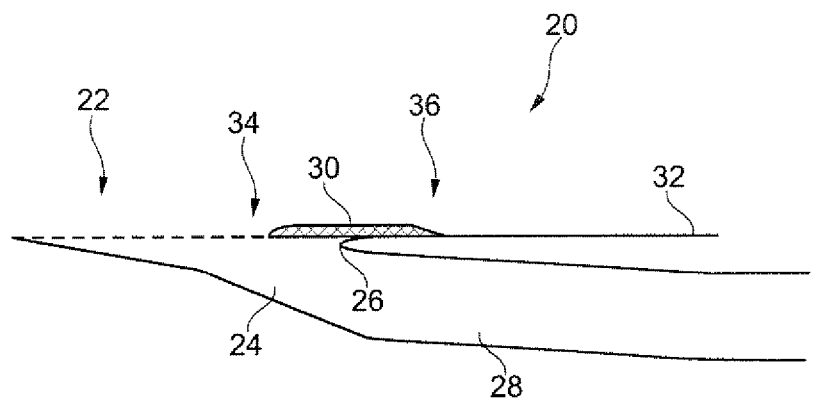
Fig. 3a
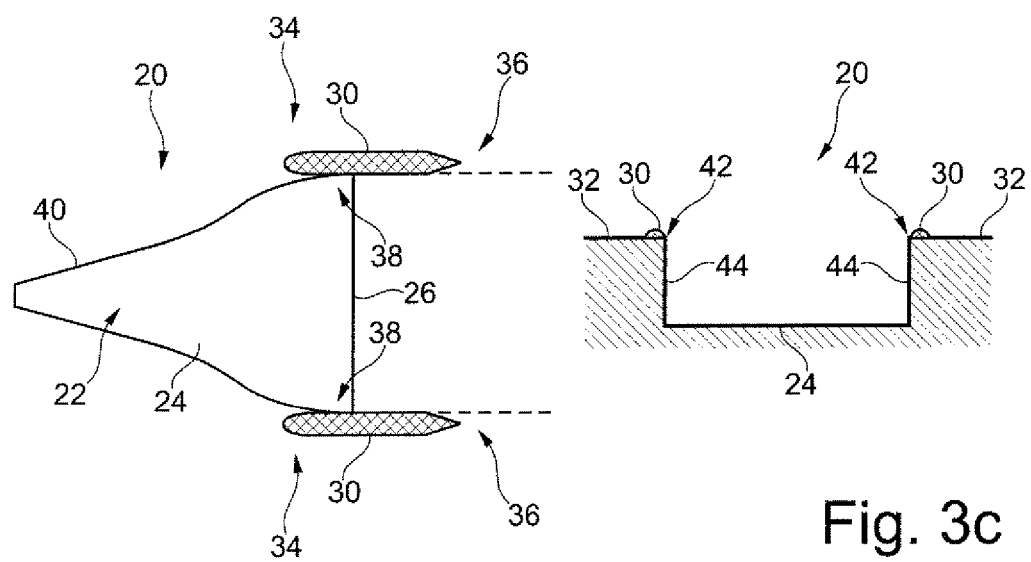
Fig. 3b
Fig. 3c

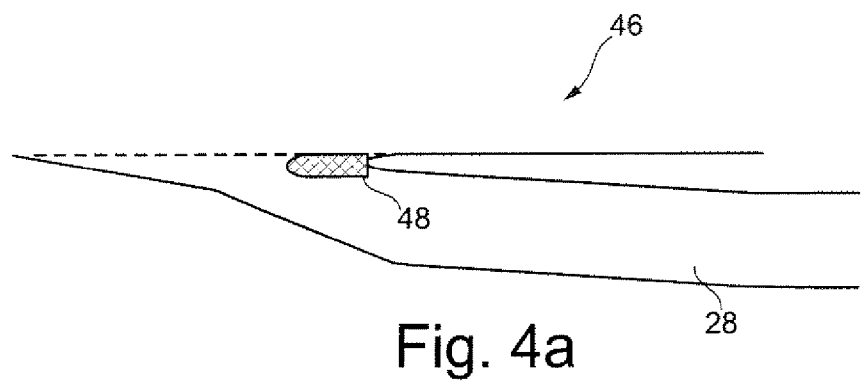
Fig. 4a
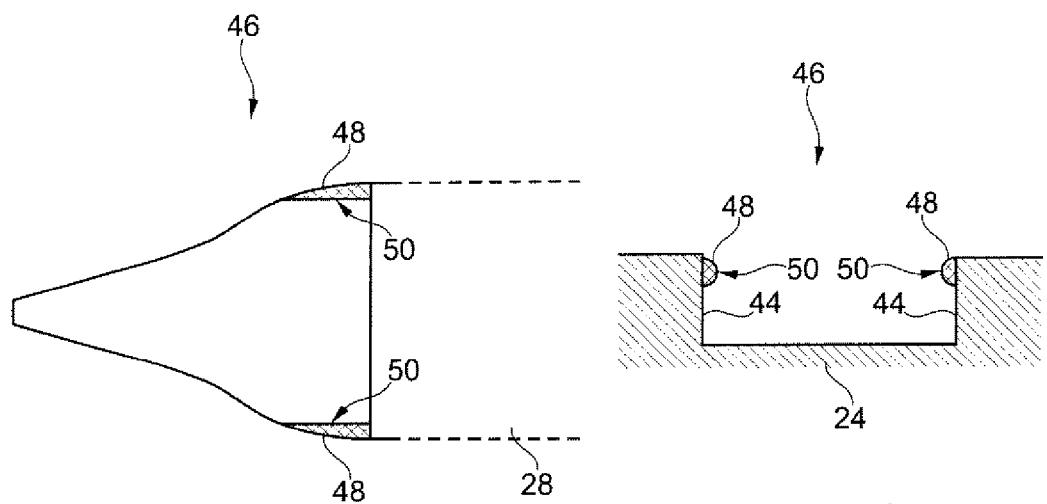
Fig. 4b
Fig. 4c

AIR INLET FOR A VEHICLE

CROSS-REFERENCE TO RELATED APPLICATIONS

This application claims the benefit of the filing date of U.S. Provisional Patent Application No. 61/131,024 filed Jun. 5, 2008, the disclosure of which application is hereby incorporated herein by reference.

BACKGROUND OF THE INVENTION

The invention relates to an air inlet for a vehicle, to the use of an air inlet for a vehicle, as well as to a vehicle comprising at least one air inlet.

Various systems in vehicles depend on being supplied with, or cooled with, external air. For example, vehicles are equipped with NACA air inlets in order to supply air conditioning equipment, ventilation systems and cooling systems as effectively as possible with external air. The particular shape of the NACA inlet, also referred to as a NACA duct or NACA scoop, was developed with the aim in aircraft in flight to guide flow that is as high in energy as possible from outside the aerodynamic boundary layer into the inlet, while at the same time increasing the aerodynamic drag of the aircraft itself as little as possible. The use of NACA inlets is very common, not only in aircraft engineering, but for example also in motor vehicles, fast trains and the like.

A NACA inlet is characterised by its curved divergent opening contour in the outer skin of the vehicle; by the bottom element that extends into the interior of the vehicle, which bottom element is usually designed as a ramp with a relatively flat angle to the outer skin; by the sharp-edged transition between the sidewalls of the bottom element and the outer skin; as well as by the so-called lip or border edge at the beginning of the connected air guide channel.

The effect of a NACA inlet is based on the fact that, for example in an aircraft in flight, at the edges of the opening contour counter-rotating vortices are generated that lead fast high-energy air from outside the aerodynamic boundary layer into the air guide channel. For example for cooling purposes, many vehicle systems draw in outside air through their NACA inlets also in stationary operation, i.e. in the case of aircraft specifically when they are situated on the ground. In stationary operation, drawing in air by way of all the opening edges of the NACA inlet results in a clearly noticeable noise, the volume of which with the usual shape of the inlet can only be reduced by increasing the cross-sectional area and thus by reducing the resulting air speed. However, in many vehicles, and in particular in aircraft, due to the very confined installation space, noise reduction can often not be achieved by increasing the cross-sectional area.

SUMMARY OF THE INVENTION

It may thus be an object of the invention to propose an air inlet that is suitable, in vehicles that are in motion, to take up outside air as effectively as possible, while in stationary operation clearly reducing the noise generated.

This object may be met by an air inlet for a vehicle, with the air inlet comprising an opening with an opening contour in an outer skin of the vehicle; at least one bottom element; one or several walls between the opening contour and the bottom element; and an air guide channel with a longitudinal axis, wherein the bottom element extends from the outer skin of the vehicle to an interior region of the vehicle underneath a border edge of the opening, and the air guide channel adjoins from between the bottom element and the border edge, wherein in the air inlet according to the invention at least one transition region between the opening contour and the walls at least in some regions comprises an essentially convex-shaped profile that essentially extends parallel to the air guide channel.

Practical experiments on unchanged NACA inlets have shown that flow noise mostly arises on the sharp-edged transition between the walls and the outer skin of the vehicle. Noise development is concentrated in particular in a region directly in front of the border edge of the opening or of the lip, in which region the contour of the bottom element or the opening contour in the outer skin extends almost parallel to the longitudinal axis of the air guide channel. As a result of the proposed modifications, which are essentially located in this region of the NACA inlet, in stationary operation considerable noise reduction may be achieved while the air throughput in stationary operation may remain unchanged. Conversely, with no change in the noise level, higher flow speeds and thus smaller channel sections may be implemented. Noise reduction in stationary operation may be achieved in particular in that sharp edges and sharp changes in the cross sections at the openings are reduced so that the inflowing air is channelled into the air guide channel more harmonically and with reduced vortex generation. In normal operation of the vehicle, in an aircraft thus during flight, the effectiveness of the air inlet designed according to the invention may essentially be not reduced when compared to that of conventional NACA air inlets.

In an advantageous improvement of the air inlet according to the invention, parallel to the longitudinal axis of the air guide channel, the outer skin may comprise essentially convex-shaped profiles whose inside edge in each case adjoins a section of the walls, which section is parallel to the axis. This means that directly at the opening contour in the region of the border edge, convex-shaped profiles smooth the transition into the air guide channel for the inflowing air, wherein the profile curves outwards from the outer skin of the vehicle. By means of the convex-shaped profile the otherwise usually sharp edge between the walls and the outer skin is replaced by a harmonic and continuous transition region. Accordingly, the inflowing air causes fewer vortices and thus lower flow noise.

It may particularly be preferred if the above-mentioned profiles are shaped so that they taper at least at one end. In this arrangement a conical or drop-shaped taper would be aerodynamically sensible. In this way, in flight, or during forward motion of the vehicle, the external flow encounters less drag. As a result of this, the additional drag that arises as a result of the air inlet according to the invention is significantly reduced.

A further advantageous embodiment of the air inlet according to the invention may provide for the walls to comprise convex-shaped profiles whose outer edge in each case adjoins a section of the walls that is parallel to the axis. In this arrangement the transition section between the outer skin and the walls may also be smoothed, however the profile is not situated on the outer skin but directly on the walls of the air inlet. Consequently, profiles that are curved towards each other are situated on two opposite walls of the air inlet, which profile may make it possible for the air to harmonically enter the air guide channel.

It may particularly be preferred if in each case the inside edge of the above profiles, at least in sections, extends essentially parallel to the longitudinal axis of the air guide channel. This essentially corresponds to the direction of flow in flight or while driving along, so that as a result of this arrangement high effectiveness in flight operation or driving operation remains ensured.

In a further advantageous embodiment of the air inlet according to the invention, the opening contour in a region near the border edge may be rounded. In this way the same effect may be achieved as is the case with additionally installed convex-shaped profiles. However, it would be advantageous if this measure were planned right from the outset for the corresponding air inlet, because retrofitting by rounding the edges of the opening contour at a later stage would be relatively involved.

It may particularly be preferred if the profiles are implemented by essentially semi-cylindrical profile components that can be installed on a surface of the vehicle. As a result of this, in particular, reducing the flow noise is simplified because pre-fabricated profile components may also be installed on already existing NACA inlets in order to achieve noise reduction at a later stage. Already existing NACA inlets can easily be modified with stick-on profile components.

Furthermore, it may particularly be preferred if the profile components have an elongated shape whose respective extension is parallel to the longitudinal axis of the air guide channel. As a result of the elongated shape the profile components are not only arranged in the region of the transition between the border edge and the opening contour, but instead also extend in upstream or downstream direction. By correspondingly adapting the profile components, for example by tapering them on one end or on both ends, a reduced increase in the additional drag is achieved, which in a particularly favourable case would be less than is the case with short stub-shaped profile components.

Furthermore, the object is met by the use of an air inlet according to the invention, on a vehicle, on one or several essentially stationary objects, and also by an aircraft that comprises at least one air inlet according to the invention with the above-mentioned characteristics.

BRIEF DESCRIPTION OF THE DRAWINGS

Further characteristics, advantages and application options of the present invention are disclosed in the following description of the exemplary embodiments and of the figures. All the described and/or illustrated characteristics per se and in any combination form the subject of the invention, also irrespective of their composition in individual claims or their interrelationship. Furthermore, identical or similar components in the figures have the same reference characters. The following are shown:

FIGS. 3a-c: air inlet according to the invention, first exemplary embodiment;

FIGS. 4a-c: air inlet according to the invention, second exemplary embodiment.

DETAILED DESCRIPTION

Figure 1A:
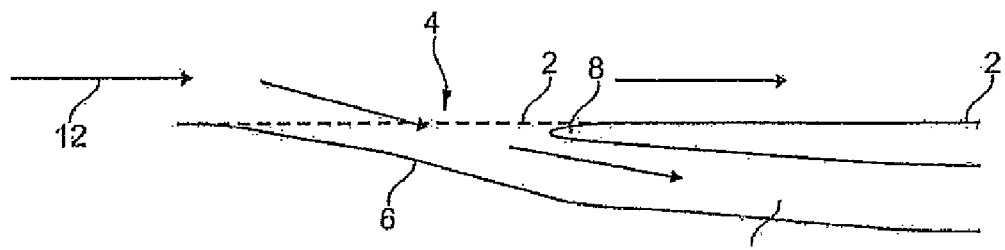
FIGS. 1a+b: a NACA inlet from the state of the art, and a flow configuration in operation (e.g. in flight)

FIG. 1a shows a lateral section view of a NACA air inlet from the state of the art. In the outer skin 2 there is an opening 4, underneath which a bottom element 6 extends from the outer skin 2 into an interior region of the vehicle. Underneath a border edge 8, which comprises a rounded shape and is thus also referred to as a "lip" between the bottom element 6 and the border edge 8 an air guide channel 10 adjoins which channels air from the surroundings to the respective system. The airstream 12, which in the drawing plane comes from the left-hand side, passes through the opening 4 and in doing so partly enters the air guide channel 10, while only minimally changing the drag of the vehicle.

Figure 1B:
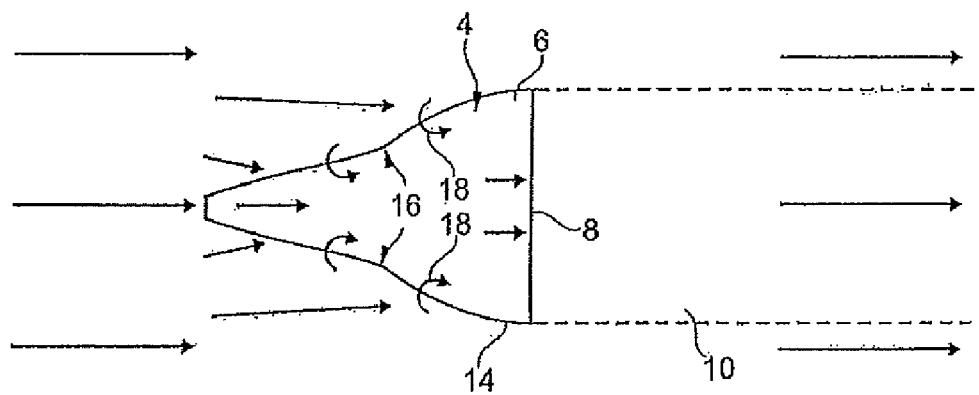

FIG. 1b shows a top view of the opening 4. The diagram shows the divergent opening contour 14, wherein the bottom element 6 usually comprises the same contour so that between the opening contour 14 and the bottom element 6 there are walls 16 which extend so as to be essentially perpendicular to the outer skin 2 of the vehicle. The airstream 12 passes through the opening 4 and, while forming counter-rotating vortices 18, enters the air guide channel 10.

Figure 2A:
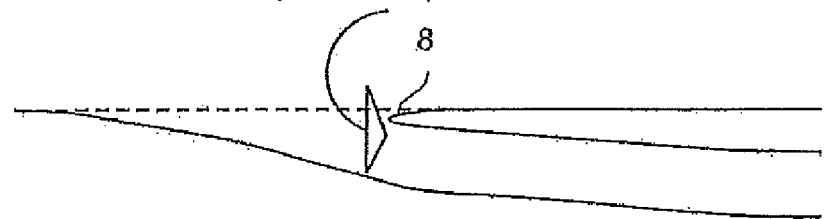
FIGS. 2a+b: a NACA inlet from the state of the art, and a flow configuration in stationary operation.
Figure 2B:
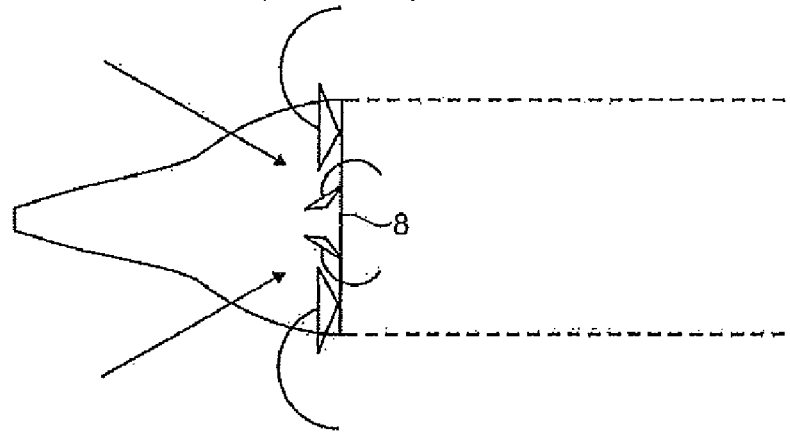

FIGS. 2a and 2b show the flow pattern during stationary operation of a NACA inlet from FIGS. 1a and 1b. The diagram shows that the actual effect of the counter-rotating vortices 18 does not occur in stationary operation. Instead, air is drawn in from all directions and is guided around the opening contour 14 or the border edge 8 and into the air guide channel 10. In this process, in particular in the region of the transition from the opening contour 14 to the border edge 8, small but relatively high-energy vortices are generated which in the case of substantial air inflow represent a particularly high noise level.

FIG. 3a shows a lateral section of an air inlet 20 according to the invention, with an opening 22, a bottom element 24, a border edge 26 and an air guide channel 28. Above the border edge 26 there is a profile component 30 on an outer skin 32 of the vehicle, which profile component 30 extends upstream and downstream. The front 34 of the profile component 30 is rounded, while the rear end 36 is flat. This is an aerodynamically favourable shape that approximates an aerodynamically ideal drop-shape.

In a top view of the air inlet 20 according to the invention, FIG. 3b illustrates the shape of two opposite profile components 30. The rear ends 36 of the profile components 30 taper to a point, while the front ends 34 are rounded also in top view. Consequently, in regions 38 between an opening contour 40 and the border edge 26 rounded inlets for the airstream result, which airstream originates from a rear region of the air inlet, in which region the border edge 26 is situated. Airstreams that originate from laterally of the opening 22 and from behind the border edge 26 may flow, both by way of a border edge 26, which in NACA inlets is usually already rounded, and by way of the profile components 30, into the air guide channel 28 as far as possible without forming noise-generating vortices. As a result of this, the noise load is minimised.

Furthermore, FIG. 3c in a front section view shows the semi-circular profile of the profile components 30 as well as the position with its respective inside edge 42 on the walls 44 between the outer skin 32 and the bottom element 24.

FIGS. 4a-4c in a corresponding view show a second exemplary embodiment. An air inlet 46 is shown in which profile components 48 are used that also comprise a semi-circular cross section but that are arranged on the walls 44 of the air inlet 46 so that their outer edge adjoins flush with the outer skin 32. In this arrangement the profile components 48 are designed in such a way that, as shown in FIG. 4b, their edges 50 that project into the opening 22 extend parallel to the air guide channel 28 or to the direction of flow.

Figure 5A:
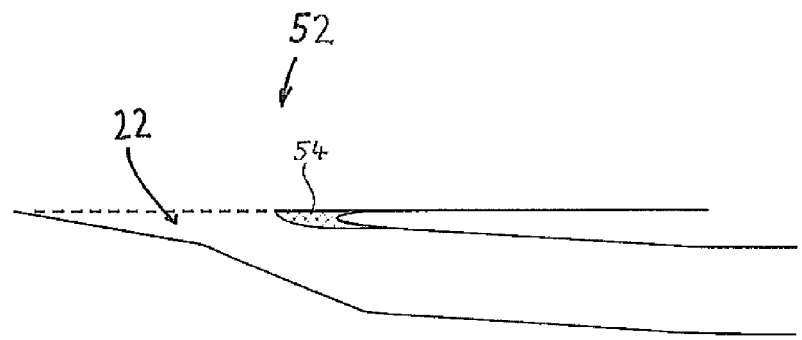
FIGS. 5a-c: air inlet according to the invention, third exemplary embodiment.
Figure 5B:
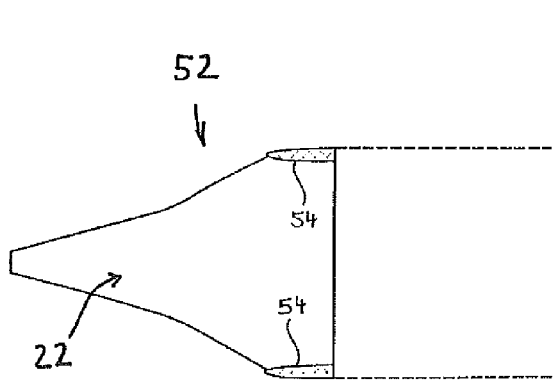
Figure 5C:
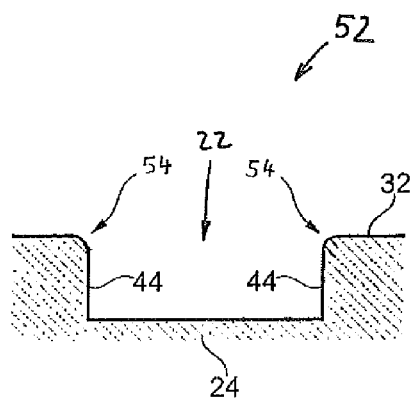

FIGS. 5a-5c show a third exemplary embodiment, which essentially differs from the first two mentioned exemplary embodiments in that no separate profile components 30 or 48 are used. Instead, in an air inlet 52 the transition between the outer skin 32 and the walls 44 is rounded so that a rounded profile 54 is created on each side of the opening 22. As shown in FIGS. 5a and 5b, this rounded profile 54 extends from the border edge 26 upstream to a region of the opening contour 40, in which region the opening contour extends essentially parallel to the direction of flow or to the longitudinal axis of the air guide channel 28.

The air inlet according to the invention provides several advantages when compared to air inlets of the state of the art. Firstly, with them it is possible, as is the case with commonly used NACA air inlets, to remove air from a flow boundary layer as effectively as possible and to provide said air to air-consuming systems. Likewise, in stationary operation, i.e. in aircraft while they are on the ground, and in other vehicles while they are at a standstill, the noise load may be reduced, which noise load in the case of NACA inlets in the state of the art results from the sharp-edged transitions between the opening in the outer skin, the border edge or lip, and the walls to the bottom element. By using profile components or rounded edges no, or only a very small, additional aerodynamic drag arises, but the noise load may be clearly reduced. In this way it could also be possible to provide air inlets with a smaller opening cross section, which air inlets, at the same noise load as a common NACA inlet, comprise smaller dimensions and consequently, during normal operation of the vehicle or when the aircraft is in flight, cause less aerodynamic drag than is the case with a commonly used NACA inlet.

The shape of profile components that may possibly be used is not limited to the shapes of the above-mentioned exemplary embodiments. The profile components may therefore also be situated, for example, on the outer skin or on the walls; it is not mandatory for their outer edges to join the opening contour. Any other imaginable arrangement of rounded or harmonically and continuously-shaped area transitions in the form of profile components may be used in the implementation of the air inlet according to the invention.

It should be emphasised that the term "vehicle" is not limited to an earthbound means of transport, but instead refers to any movable device. Accordingly, the term covers all types of motor vehicles, flying devices, rail-bound vehicles and the like. Furthermore, devices and objects may be equipped with the air inlet according to the invention, which devices and objects, while not moving, are nevertheless surrounded by an airstream, for example in a wind tunnel or the like.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

LIST OF REFERENCE CHARACTERS

2 Outer skin
4 Opening
6 Bottom element
8 Border edge
10 Air guide channel
12 Airstream
14 Opening contour
16 Walls
18 Vortex
20 Air inlet
22 Opening
24 Bottom element
26 Border edge
28 Air guide channel
30 Profile component
32 Outer skin
34 Front of the profile component
36 Rear end of the profile component
38 Region between the opening contour and the border edge
40 Opening contour
42 Inside edge of the profile components
44 Walls
46 Air inlet
48 Profile components
50 Edges of the profile components, which edges project into the opening
52 Air inlet
54 Rounded profile

The invention claimed is:

1. An air inlet for a vehicle, comprising:
an opening with an opening contour in an outer skin of the vehicle;
at least one bottom element;
at least one wall between the opening contour and the bottom element; and
an air guide channel having a longitudinal axis,
wherein the bottom element extends from the outer skin of the vehicle to an interior region of the vehicle underneath a border edge of the opening, the air guide channel adjoining from between the bottom element and the border edge, and
wherein the at least one wall comprises a substantially convex-shaped protrusion extending substantially parallel to the air guide channel; and
wherein an outer edge of the protrusion adjoins a section of the at least one wall parallel to the longitudinal axis.

2. The air inlet of claim 1,
an inside edge of the protrusion adjoins a section of the at least one wall parallel to the longitudinal axis.

3. The air inlet of claim 2,
wherein the protrusion is shaped to taper at least at one end thereof.

4. The air inlet of claim 1,
wherein an inside edge of the protrusion, at least in a section, extends substantially parallel to the longitudinal axis of the air guide channel.

5. The air inlet of claim 1,
wherein the opening contour in a region near the border edge is rounded.

6. The air inlet of claim 1,
wherein the protrusion comprises at least one substantially semicylindrical profile component configured to be installed on a surface of the vehicle.

7. The air inlet of claim 6,
wherein the at least one protrusion component has an elongated shape having an extension parallel to the longitudinal axis of the air guide channel.

8. The air inlet according to claim 1, wherein the longitudinal axis of the air guide channel substantially corresponds to the direction of flow in flight or while driving.

9. A vehicle comprising at least one air inlet, the air inlet comprising:
an opening with an opening contour in an outer skin of the vehicle;
at least one bottom element;
at least one wall between the opening contour and the bottom element; and
an air guide channel having a longitudinal axis, wherein the bottom element extends from the outer skin of the vehicle to an interior region of the vehicle underneath a border edge of the opening, the air guide channel adjoining from between the bottom element and the border edge, and wherein the at least one wall comprises a substantially convex-shaped protrusion extending substantially parallel to the air guide channel; and wherein an outer edge of the protrusion adjoins a section of the at least one wall parallel to the longitudinal axis.

10. An air inlet for a vehicle, comprising:

an opening with an opening contour in an outer skin of the vehicle;

at least one bottom element;

at least one wall between the opening contour and the bottom element; and an air guide channel having a longitudinal axis, wherein the bottom element extends from the outer skin of the vehicle to an interior region of the vehicle underneath a border edge of the opening, the air guide channel adjoining from between the bottom element and the border edge, wherein at least one transition region exists between the opening contour and the at least one wall, at least one region comprising a first substantially convex-shaped protrusion extending substantially parallel to the air guide channel, and wherein an end of the protrusion tapers to a point in at least one longitudinal direction.

11. The air inlet according to claim 10, further comprising a second substantially convex-shaped protrusion situated on a second wall opposite the first protrusion.

12. The air inlet according to claim 11, wherein the first and second protrusions are curved toward one another.

13. The air inlet according to claim 10, wherein the longitudinal axis of the air guide channel substantially corresponds to the direction of flow in flight or while driving.

14. The air inlet according to claim 10, wherein the protrusion comprises at least one semicylindrical profile component configured to be installed on a surface of the vehicle.

15. The air inlet according to claim 14, wherein the at least one profile component extends in at least one of an upstream and a downstream direction of the air guide channel.

16. The air inlet according to claim 14, wherein the at least one profile component comprises a tapered end at one or both ends thereof.

* * * * *